(12) United States Patent
Melvin, II et al.

(10) Patent No.: US 9,372,255 B2
(45) Date of Patent: Jun. 21, 2016

(54) DETERMINING A POSITION OF A SUBMERSIBLE VEHICLE WITHIN A BODY OF WATER

(71) Applicant: Teledyne Instruments, Inc., Thousand Oaks, CA (US)

(72) Inventors: Robert G. Melvin, II, Sandwich, MA (US); Maurice D. Green, North Falmouth, MA (US)

(73) Assignee: TELEDYNE INSTRUMENTS, INC., Thousand Oaks, CA (US)

(*) Notice: Subject to any disclaimer, the term of this patent is extended or adjusted under 35 U.S.C. 154(b) by 0 days.

(21) Appl. No.: 14/673,132

(22) Filed: Mar. 30, 2015

(65) Prior Publication Data

US 2015/0276916 A1 Oct. 1, 2015

Related U.S. Application Data

(62) Division of application No. 13/428,800, filed on Mar. 23, 2012, now Pat. No. 8,995,229.

(60) Provisional application No. 61/467,902, filed on Mar. 25, 2011.

(51) Int. Cl.
*G01S 5/00* (2006.01)
*G01S 5/18* (2006.01)
(Continued)

(52) U.S. Cl.
CPC ... *G01S 5/18* (2013.01); *B63G 8/00* (2013.01); *G01S 3/808* (2013.01); *G01S 3/8083* (2013.01);
(Continued)

(58) Field of Classification Search
CPC ......... G01S 3/80; G01S 3/8083; G01S 3/808; G01S 15/74; G01S 15/876; B63G 8/00; B65D 88/78; G01V 1/3852
See application file for complete search history.

(56) References Cited

U.S. PATENT DOCUMENTS 3,388,683 A * 6/1968 Barhite ................ B63C 11/44
   114/325
3,860,900 A * 1/1975 Scudder ................ G01S 15/874
   367/106

(Continued)

FOREIGN PATENT DOCUMENTS

| JP | 2010-47094 A | 3/2010 |
| WO | WO 01/65271 A1 | 9/2001 |
| WO | WO 2009/039488 A1 | 3/2009 |

OTHER PUBLICATIONS

Extended European Search Report for European Patent Application No. 12765096 issued May 19, 2015.

(Continued)

*Primary Examiner* — Luke Ratcliffe
*Assistant Examiner* — Hovhannes Baghdasaryan
(74) *Attorney, Agent, or Firm* — K&L Gates LLP

(57) ABSTRACT

Methods and apparatus determining a position of a submersible vehicle within a body of water are provided. A method comprises determining an initial position of the vehicle while the vehicle is at or near a water surface. The method further comprises coupling the vehicle and a base node to a weight and determining a position of the base node once the base node and vehicle have reached the floor of the body of water using acoustic modems of the vehicle and a surface vessel to aid in calculating the position as they descend, and acoustically transferring the at rest position on the seafloor from the vehicle to the node. The method further comprises decoupling the vehicle from the node and weight and determining a position of the vehicle based on the position of the base node and acoustic signals exchanged between acoustic modems of the vehicle and the base node.

18 Claims, 15 Drawing Sheets

(51) Int. Cl.
*G01S 3/808* (2006.01)
*G01S 15/74* (2006.01)
*G01S 15/87* (2006.01)
*B63G 8/00* (2006.01)
*B65D 88/78* (2006.01)
*G01V 1/38* (2006.01)

(52) U.S. Cl.
CPC ............... *G01S 5/0054* (2013.01); *G01S 15/74* (2013.01); *G01S 15/876* (2013.01); *B65D 88/78* (2013.01); *G01V 1/3852* (2013.01)

(56) References Cited

U.S. PATENT DOCUMENTS

| | | | |
|---|---|---|---|
| 4,070,671 A * | 1/1978 | Morrow | G01S 5/26 367/6 |
| 4,229,809 A | 10/1980 | Schwalbe | |
| 5,379,268 A | 1/1995 | Hutson | |
| 5,579,285 A | 11/1996 | Hubert | |
| 6,501,704 B2 | 12/2002 | Nishimura | |
| 6,532,192 B1 | 3/2003 | Reid | |
| 6,941,226 B2 | 9/2005 | Estep | |
| 7,139,647 B2 | 11/2006 | Larsen | |
| 7,218,574 B2 | 5/2007 | Green | |
| 7,272,074 B2 | 9/2007 | Basilico | |
| 7,362,653 B2 | 4/2008 | Green et al. | |
| 7,660,189 B2 | 2/2010 | Vigen et al. | |
| 7,969,822 B2 | 6/2011 | Basilico | |
| 8,009,516 B2 | 8/2011 | Crowell | |
| 8,995,229 B2 | 3/2015 | Melvin, II et al. | |
| 2002/0064092 A1* | 5/2002 | Nishimura | B63C 11/48 367/128 |
| 2006/0178829 A1 | 8/2006 | Gaiffe | |
| 2006/0215494 A1* | 9/2006 | Thomas | B63B 22/16 367/128 |
| 2007/0014189 A1* | 1/2007 | Basilico | G01S 1/72 367/128 |
| 2007/0025185 A1* | 2/2007 | Green | B63J 99/00 367/124 |
| 2007/0297289 A1* | 12/2007 | Polvani | G01C 21/165 367/131 |
| 2008/0048881 A1 | 2/2008 | Safinya et al. | |
| 2009/0141591 A1* | 6/2009 | Basilico | G01S 1/72 367/128 |
| 2010/0061187 A1* | 3/2010 | Sodal | G01S 5/22 367/131 |

OTHER PUBLICATIONS

International Search Report of the International Searching Authority for International Application No. PCT/US12/30419 issued Jun. 20, 2012.
Written Opinion of the International Searching Authority for International Application No. PCT/US12/30419 issued Jun. 20, 2012.
International Preliminary Report on Patentability for International Application No. PCT/US12/30419 issued Mar. 18, 2014.

* cited by examiner

DETERMINING A POSITION OF A SUBMERSIBLE VEHICLE WITHIN A BODY OF WATER

CROSS REFERENCE TO RELATED APPLICATIONS

This non-provisional application is a divisional patent application claiming priority under 35 U.S.C. §121 of U.S. patent application Ser. No. 13/428,800, filed Mar. 23, 2012, titled "Determining A Position Of A Submersible Vehicle Within A Body Of Water," which claims the benefit of U.S. Provisional Patent Application No. 61/467,902, filed Mar. 25, 2011, titled "Determining a Position of a Submersible Vehicle Within a Body of Water," each of which is hereby incorporated by reference herein in its entirety.

BACKGROUND

The present disclosure relates generally to the field of underwater geopositioning systems and methods.

Undersea mobile or autonomous systems do not have access to positioning assets, such as global positioning system (GPS) or radio frequency (RF) assets, that are available to other non-submersible vehicles and systems. The need for navigational assistance beneath the water is further exacerbated by the general lack of available visible references in such undersea systems.

One technique that may be used to provide positioning data for undersea vehicles is a long baseline (LBL) method that operates by relying on a series of fixed underwater transponder beacons. A transducer on the mobile system emits a signal that the beacons detect, after which the beacons emit response signals. The mobile estimates its distance from each of the beacons by timing the travel of the signals, thus enabling it to calculate its own position relative to the known positions of the beacons.

LBL systems require extensive preparation and surface expression by the deploying asset (e.g., a small craft)—a factor of importance in military applications. LBL systems employ an assumption of sound being spherically radiated from multiple distant source nodes (using either clocks or transponder approaches). At the mobile, one employs an algorithm that relates the intersection of spheres to a common point. This point can only be calculated if the mobile has a priori knowledge of the positions of the multiple sound sources. If the positions are known in a 3-dimensional Cartesian coordinate system, then the mobile locates itself within that system. If the geo-locations of the sources are also known, then the mobile can also position itself within global coordinates. The locations of the sources must be pre-programmed into the mobile prior to release of the unit. Accordingly, LBL systems require that the source nodes be surveyed after deployment to determine their position before they can be used to locate the mobile system. When conducted in deep water, the survey may take days. Further, the survey uses pings from a surface ship that can be substantially affected by acoustic conditions present, which in turn can affect the accuracy of the source node position measurements. LBL systems may also require that a sound velocity profile be measured in order to correct the range measurements, which can require additional time and equipment.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
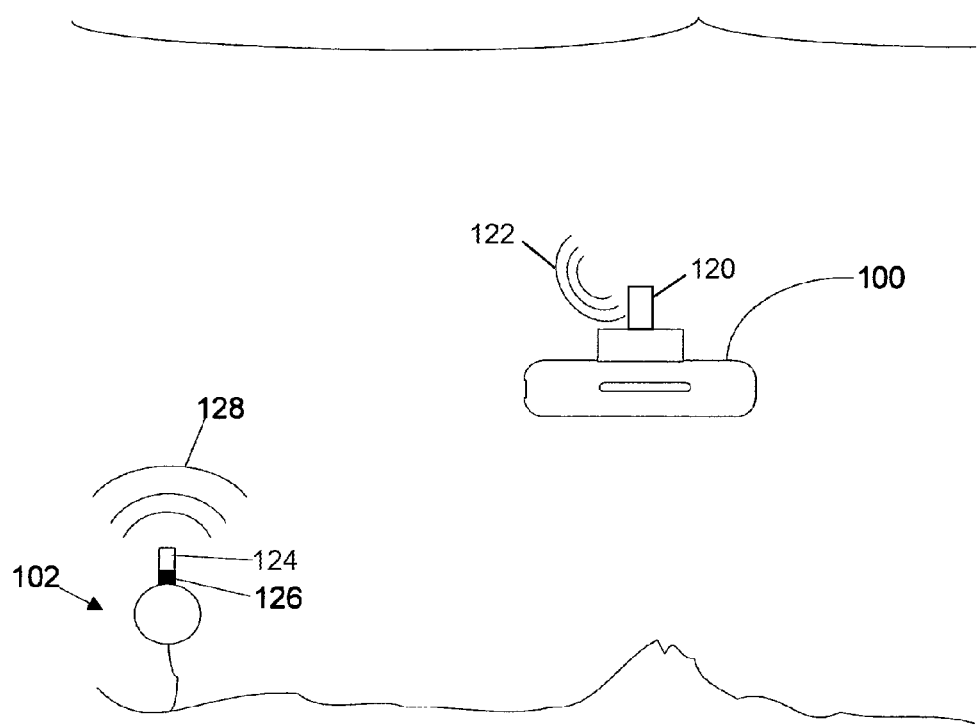
FIG. 1A is an illustration of an underwater communications environment in which a base node operates with a remote node to establish the remote node's geophysical position according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for providing an accurate bottom-mounted node (e.g., a node placed at or near the bottom surface of a body of water) for use in determining the position of a mobile system such as an underwater vehicle or vessel are shown according to various exemplary embodiments. Underwater vehicles utilize an inertial navigation system (INS) or other type of position determination system to estimate their position while beneath the surface of a body of water. The navigation system may be calibrated on the surface of the body of water before the vehicle is submersed (e.g., using a GPS system). During the course of a mission (e.g., over time and changes in position), errors in the determined position accumulate and the estimated position can become highly inaccurate. One method for addressing this accumulated inaccuracy is to resurface and recalibrate the navigation system. This can significantly interfere with completion of the mission or survey, particularly when performing surveys in deep water, due to the time needed to resurface and return to the bottom of the body of water.

Another method for obtaining a more accurate underwater position is to use a long baseline (LBL) system to determine the position of the submersible vehicle. LBL systems use multiple nodes to determine the position of the vehicle. As discussed above, LBL systems require that the multiple source nodes be surveyed after deployment to determine their position before they can be used to locate the mobile system. The survey may take a substantial amount of time.

Yet another method for obtaining a more accurate underwater position is to use an ultra short baseline (USBL) system to determine the position of the submersible vehicle. USBL allows for the use of a single "fixed" point of reference by having several closely positioned transducers on the remote mobile system or vehicle, each nearly simultaneously receiving the same signal from a fixed reference. The system calculates the phase differences of the same signal received at each of the transducers, and from these differences, is able to estimate a bearing for the signal. Some USBL systems may be mounted on a surface vessel and used to aid navigation of a submersible vehicle. Such systems may require that the surface vessel maintain a position near the submersible vehicle. Also, acoustic conditions in the water column through which the acoustic signals travel may limit the effectiveness and/or accuracy of the system.

Various exemplary embodiments described herein utilize USBL-based communication systems and/or methods to provide a base node (e.g., a bottom-anchored base node) having an accurately determined position that can be used to calibrate and/or update the position of a mobile system (e.g., an underwater vehicle) beneath the surface of a body of water. In some embodiments, a vehicle is equipped with an acoustic modem and a transceiver array configured to determine range, bearing, geoposition, and/or time information associated with a received signal. The vehicle may also be equipped with an INS.

An accurate position of the vehicle is obtained while the vehicle is surfaced. The vehicle and a base node (e.g., a deep water base node) are coupled to an anchor weight designed to cause the vehicle and base node to sink to the bottom of the body of water. While the vehicle descends to the bottom, an accurate position of the vehicle (and the base node) is maintained using signals exchanged between a surface ship and the underwater vehicle from which a position of the vehicle is determined using the acoustic modem and transceiver array of the vehicle. In some embodiments, the vehicle may also be equipped with a conductivity, temperature, and depth (CTD) sensor or a sound velocity sensor (SVS) configured to measure a sound velocity profile based on measured data. The CTD or SVS sensor may aid in maintaining the accuracy of the position determined by the acoustic modem and transceiver array by allowing the vehicle to account for the effect of the properties of the water on the transmission of the acoustic signals. The acoustic modem, transistor array, CTD and/or SVS may be used to calibrate the position of the INS to ensure the position remains accurate and counteract any accumulated errors in the position determined by the INS.

Once the bottom of the body of water is reached, the vehicle is disengaged from the base node and weight. Because the vehicle maintains an accurate knowledge of position during descent and the base node is coupled to the vehicle until it reaches the bottom, the vehicle is aware of the accurate resting position of the base node on the floor of the body of water and stores the position in a memory. The vehicle may then maintain an accurate position throughout a mission or survey by exchanging acoustic signals with the base node, determining range, bearing, geoposition, and/or time information using the acoustic modem and transceiver array, and determining an updated position based on the stored position of the base node. The updated position may be used to calibrate or update (e.g., continuously, periodically, upon occurrence of an event, etc.) a position determined by the INS of the vehicle.

In other exemplary embodiments disclosed herein, the position of the base node may be determined by the base node itself rather than based on communication with the vehicle. The base node may be equipped with an acoustic modem, transceiver array, INS, CTD sensor, SVS sensor, and/or GPS. The base node may be configured to determine an accurate initial position while on the surface of the body of water (e.g., using a GPS of the base node or a surface ship). The base node may be connected to an anchor weight to cause the base node to descend to the bottom of the body of water. As the base node descends, the position of the base node is updated (e.g., a position determined by the INS of the base node is updated) using acoustic signals exchanged between a surface ship and the base node from which a position of the base node is determined using the acoustic modem and transceiver array of the base node. The base node may also use a CTD or SVS to assist in maintaining an accurate position during descent. When the base node reaches the floor of the body of water, it has an accurate knowledge of its position, which may be stored in a memory of the base node. An underwater vehicle or mobile node equipped with an acoustic modem may then send requests to the base node to obtain a position of the underwater vehicle based on the known position of the base node and bearing, range, geoposition, and/or time information determined using the acoustic modem and transceiver array of the base node. In some embodiments, the vehicle may also be equipped with a transceiver array.

Various exemplary embodiments disclosed herein may enable effective and/or accurate determination of the position of a submersible vehicle using a node anchored at or near a bottom surface of a body of water. In some embodiments (e.g., when the submersible vehicle is performing a survey near the bottom of the body of water), the determined position may be more accurate than methods that rely on communications with a surface vessel because the amount and/or variation of water through which acoustic signals must travel may be less. Various embodiments may enable the determination of an accurate position of a submersible vehicle or other type of remote or mobile node in real or near-real time.

Referring now to FIG. 1A, an illustration of an underwater communications environment in which a base node operates with a remote node to establish the remote node's geophysical position is shown according to an exemplary embodiment. A submersible 100 includes an underwater acoustic modem system with transducer 120 that is used to transmit a request signal 122. Acoustic modems enable the transmission of information in acoustic signals (e.g., contained or encoded in the signals), such as depth, environmental conditions, vehicle status (e.g., fuel status), etc. In some embodiments, submersible 100 is a submersible vehicle (e.g., an autonomous undersea vehicle, a manned or unmanned vehicle, etc.). In other embodiments, submersible 100 may include any other type of electronic device that may be submersed and for which a position of the device may be desired, such as a handheld device for use with diving.

A fixed base system 102 receives signal 122 at a multi-transceiver array 126 from which the bearing of signal 122 is determined. In the illustrated exemplary embodiment, the depth and geophysical position of the fixed base system 102 is known and, together with a bearing calculation of the original request signal, is transmitted within a broadband reply signal through a transducer 124 to submersible 100. A timing mechanism (not shown) is employed to measure the time of travel of one or more signals between the systems. This can be accomplished by providing synchronized clocks on both systems or programming the autonomous system with knowledge of the time taken to issue the response signal from the base system and measuring the time of travel (and thus range) between the systems. A processor (not shown) on the submersible 100 can now calculate its own geophysical position knowing its own depth, the depth and geophysical position of the base system, the bearing calculation, and range between the systems. Systems, devices and methods that may be utilized in providing communication between a submersible and a base system or node are described in U.S. Pat. No. 7,362,653, incorporated herein by reference in its entirety.

Figure 1B:
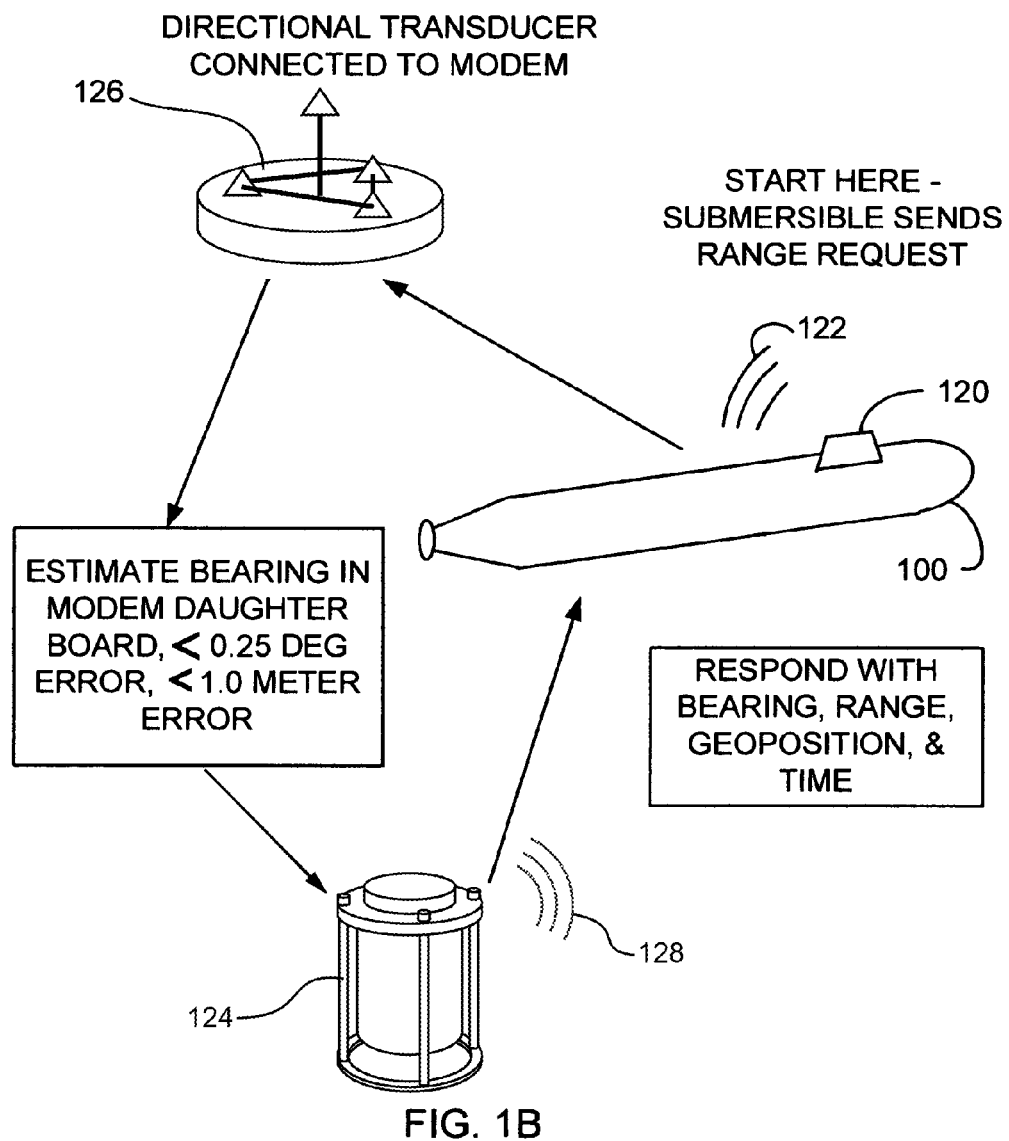
FIG. 1B is a diagram of a system for determining the location of a remote node using a base node according to an exemplary embodiment.

Referring now to FIG. 1B, a diagram of a system for determining the location of a remote node using a base node is shown according to an exemplary embodiment. Submersible 100 first sends a request signal 122 to a base system (not shown) at a multi-transceiver array 126. A controller (not shown) on the base system estimates the bearing of the request signal by analyzing the signals received at array 126. Finally, the base system sends a response message 128 out of transducer 124 with a message including the depth and geophysical position of the base system and bearing calculation. A controller on the submersible 100 is programmed to calculate the range between itself and the base system based on the time lapse between the request signal and receipt of the response signal and, together with knowledge of its own depth and the data received in the response signal, calculates its own geophysical position.

Figure 2:
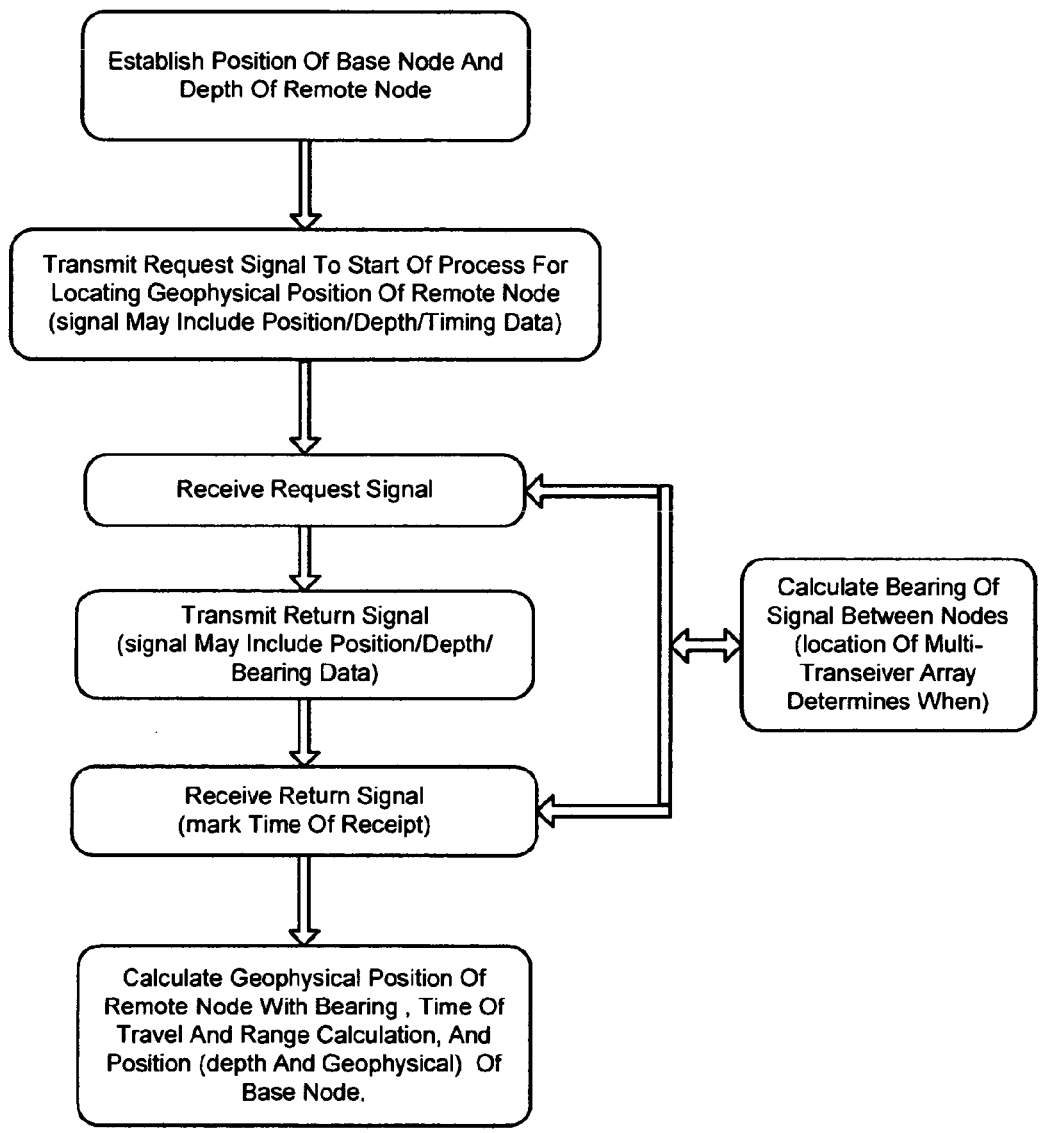
FIG. 2 is a flow diagram of a process for determining the location of a remote node using a base node according to an exemplary embodiment.
Figure 3:
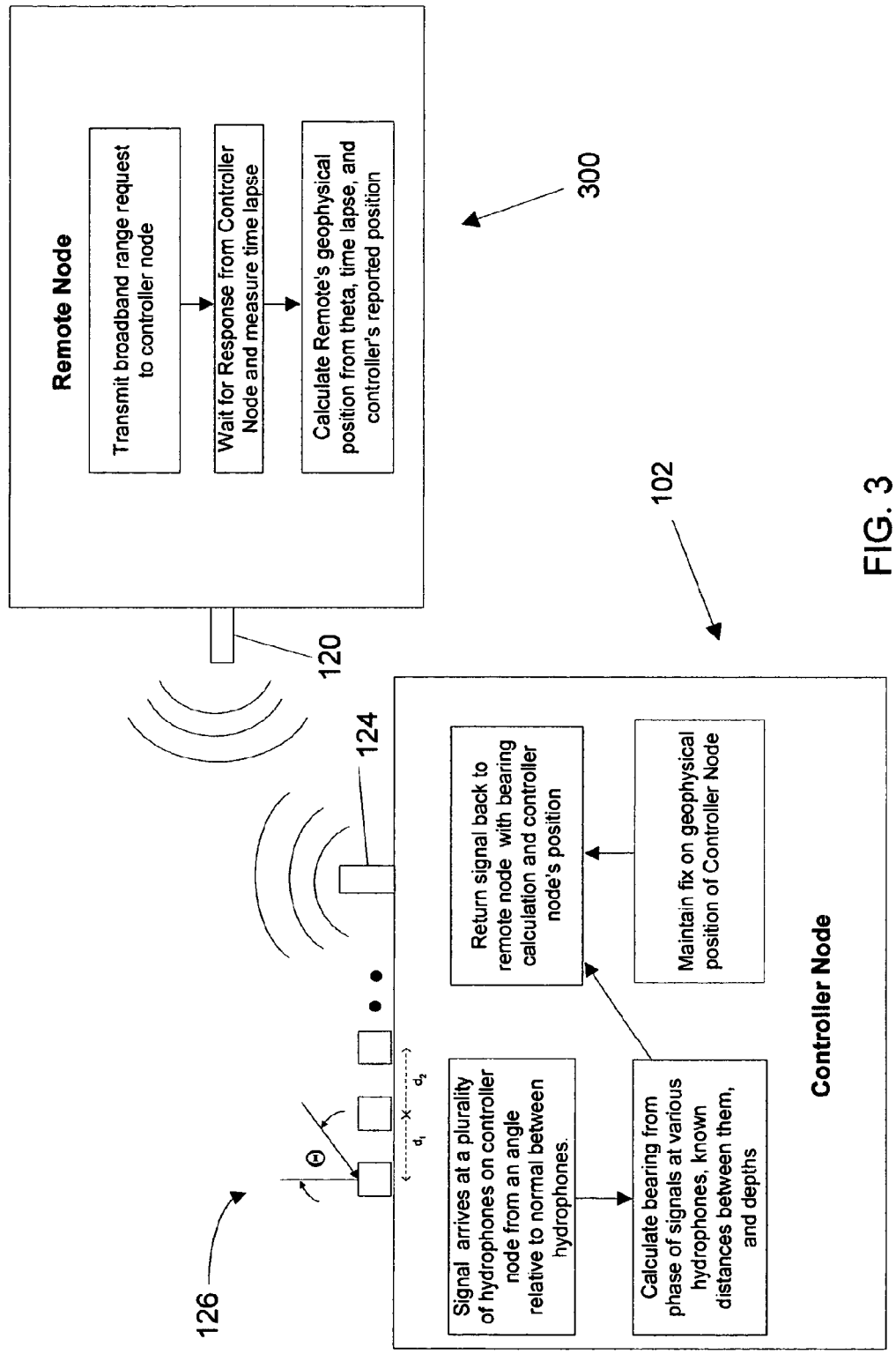
FIG. 3 is a hybrid block and flow diagram of a remote modem system and a base modem according to an exemplary embodiment.

Referring now to FIG. 2, a flow diagram of a process for determining the location of a remote node using a base node is shown according to an exemplary embodiment. An initial step of the process is to establish the depth and geophysical position of the base acoustic modem system, against which the geophysical position of the autonomous system is referenced. This may be accomplished in a number of ways, including a continuous monitoring of the base system via an above water GPS device. To begin the sequence of determining the position of the autonomous system at a given time, a request signal is transmitted between the systems. Depending on the source of the request signal and arrangement of the apparatus, various data, including depth, known geophysical position, and timing data, are transmitted with the signal and is received at either the autonomous or base systems. At least one of the systems includes a "bearing" determination apparatus, e.g. a multi-transceiver array which calculates the bearing of signals it receives. Thus, a bearing calculation is made based on either a request or a response signal, depending on where bearing determining hardware has been located. The response signal contains any information necessary to complete the calculation of the autonomous system's geophysical position. FIG. 3 illustrates a hybrid block and flow diagram showing how different operations may be carried out by the remote node and base node according to an exemplary embodiment.

Figure 4:
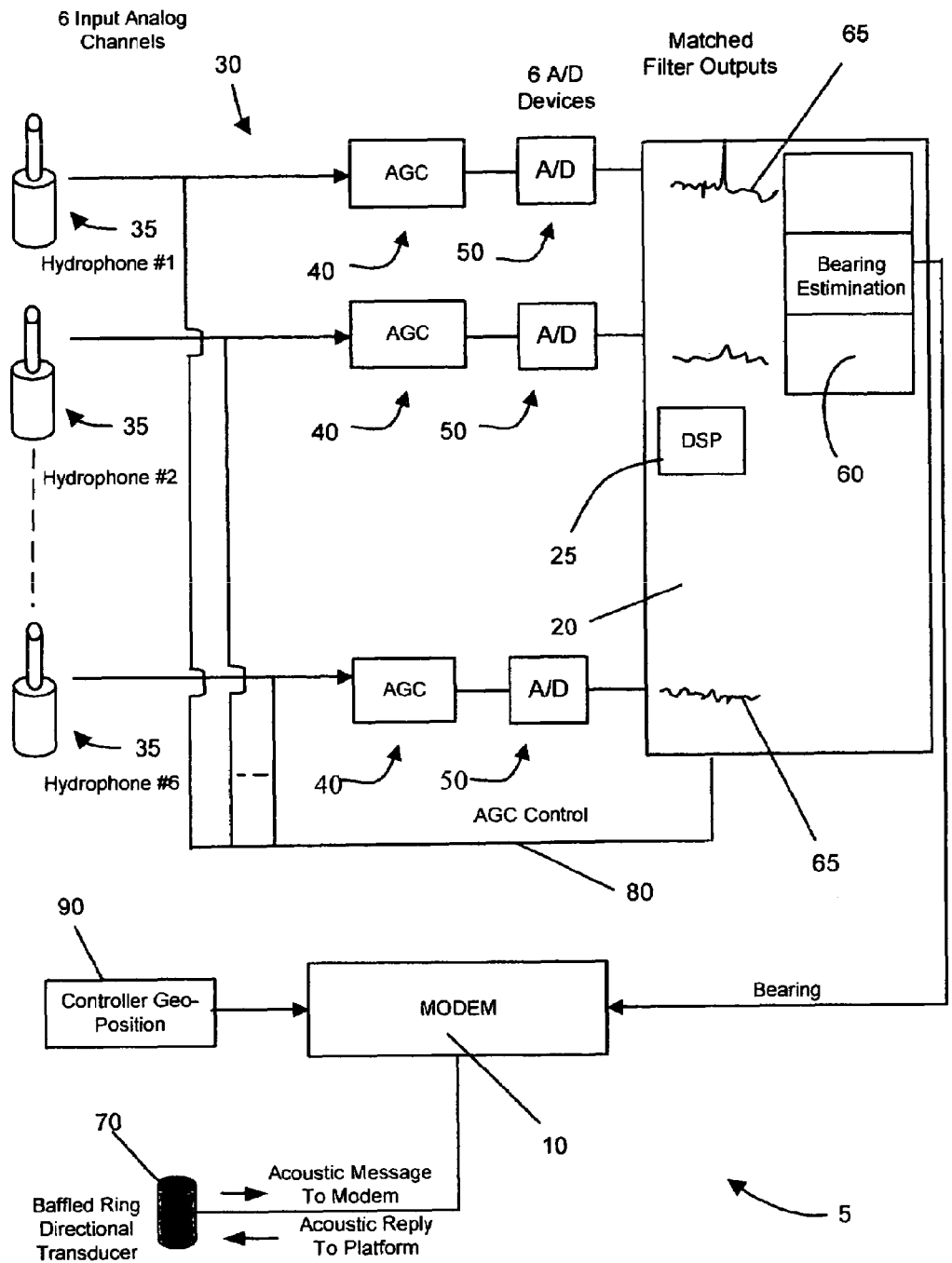
FIG. 4 is a block diagram of a receiver designed to receive an acoustic signal and estimate its bearing according to an exemplary embodiment.

Referring now to FIG. 4, a block diagram of a receiver designed to receive an acoustic signal and estimate its bearing is shown according to an exemplary embodiment. A base modem system 5 is equipped with small multi-element receivers 35 which are used to make a bearing estimation on signals received from the remote modem. This type of arrangement can reduce the burden on the mobile, which would not require much in addition to a modem, compass, and depth finder.

Base system 5 includes a modem 10, a signal processing device 20, and a unique multi-channel array 30 of hydrophones 35. Mathematical algorithms are capable of estimating the bearing of the mobile from the output of this system, given a conventional modem signal input. This bearing estimate is sent acoustically to the mobile in response along with the geoposition of the base modem system 5. The turn-around time between a mobile request and the response from the base system provides the range between the two. This information, when received by the mobile, is sufficient to locate the geoposition of the vehicle. FIG. 3 shows the sequence of operations involved in this system according to an exemplary embodiment.

Referring again to FIG. 4, multi-channel hydrophone/transducer array 30 is connected as a number of hydrophones 35. Each hydrophone 35 in the array 30 is connected to an automatic gains control (AGC) 40, whose output is connected to an analog-to-digital (A/D) device 50. The embodiment also includes a controller 20 incorporating a digital signal processor (DSP) 25, and program module 60 for calculating the bearing estimation. Message data is sent and received by modem 10 via a multi-directional transducer 70. In the illustrated exemplary embodiment, array 30 includes six hydrophone channels; in other exemplary embodiments, the array may include any number of channels (e.g., four channels).

The interface between the physical multi-hydrophone transducer array, associated components, and the digital subsystem may be combined with well known packaging technology into a very compact multi-level signal conditioning electronics package, including all necessary signal conditioning and digitizing components. The single board system can be manufactured in approximately the size (e.g., area) of a dollar bill. DSP 25, integrated with the modem, performs the necessary digital processing of the signals.

For applications where the base and autonomous systems move rapidly with respect to each other (e.g., greater than 20 or more knots) and introduce a significant "Doppler" effect in acoustic signal transmissions, compensation may be used to counter the effects and reliably process data within transmissions. An example of compensating for these effects is described in U.S. Pat. No. 7,218,574, filed on Nov. 18, 2004, which is incorporated herein by reference in its entirety. An embodiment of the technique comprises the steps of generating a communication signal with an acquisition component for providing an initial estimate of the range rate. The acquisition component is a nonlinear frequency modulated signal whose signal characteristics are not substantially affected by the range rate and is preferably in the form of a hyperbolic frequency modulated signal. The initial signal component is followed by a second set of signals, preferably a set of single frequency tonals, that are used to obtain a more precise estimate of range rate. The communication signal is then demodulated using the more precise estimate of range rate to compensate for the effects of range rate on the communication signal so that the communication signal appears to have not been influenced by the effects of range rate.

Figure 5:
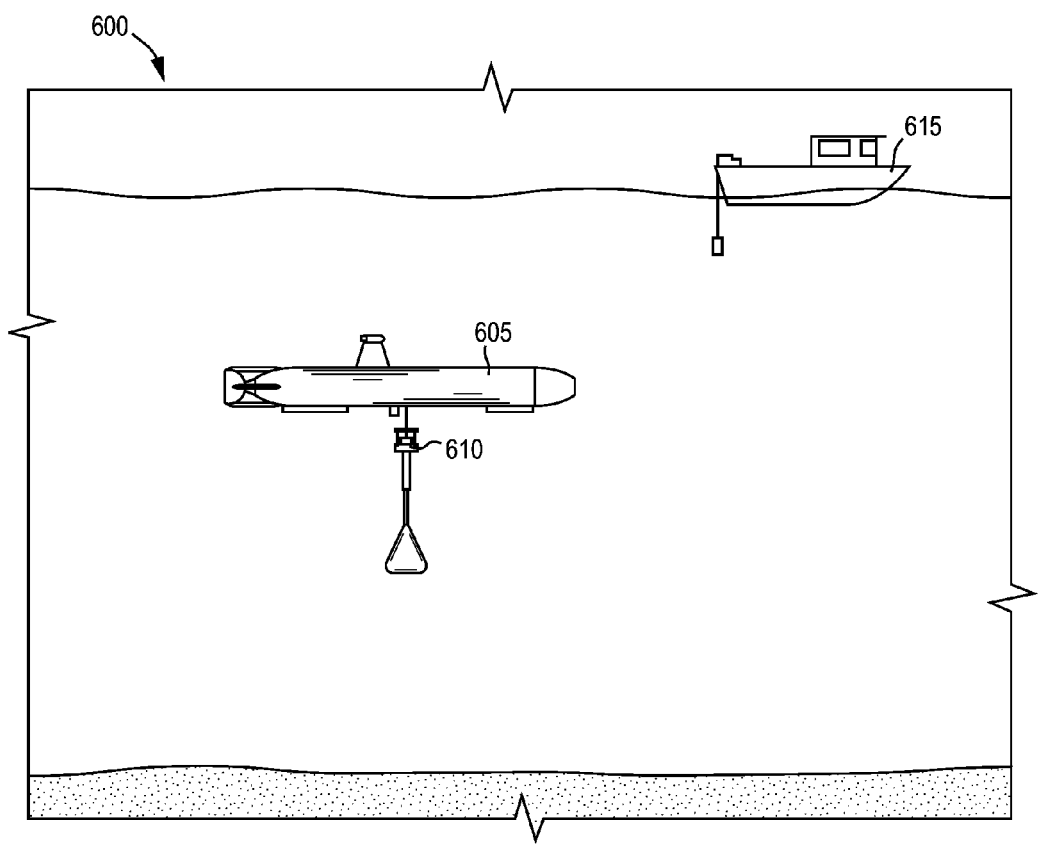
FIG. 5 is an illustration of a system for determining a position of a base node for use in an underwater navigation system according to an exemplary embodiment.

Referring now to FIG. 5, an illustration of a system 600 for determining a position of a base node for use in an underwater navigation system is shown according to an exemplary embodiment. System 600 includes a submersible vehicle 605 and a base node 610. Vehicle 605 is configured to communicate with a surface vessel 615 to determine a position of vehicle 605. Vehicle 605 may be configured to utilize an ultra short baseline (USBL) method to determine the position of vehicle 605 through communication with surface vessel 615. Surface vessel 615 has a position determination circuit or system (e.g., GPS) such that the position of surface vessel 615 is known. For example, vehicle 605 may include a transceiver or transducer array (e.g., an array of closely positioned hydrophones or transducers) and an acoustic modem configured to determine a position of vehicle 605 by using acoustic signals exchanged between vehicle 605 and a transponder of surface vessel 615 to determine range, bearing, geoposition, and/or signal transmission and/or receipt time information with respect to surface vessel 615. Determination of the position may be performed using methods similar to those described with respect to the exemplary embodiments of FIGS. 1A through 4. In the following discussion, the transceiver or transducer array and acoustic modem may together be referred to as a directional acoustic transponder (DAT).

The DAT of vehicle 605 may be used to maintain an accurate position of vehicle 605 during underwater descent of vehicle 605 through communication with surface vessel 615. Vehicle 605 may be coupled to a base node 610, and vehicle 605 and base node 610 may be coupled to an anchor weight configured to cause vehicle 605 and base node 610 to sink to the bottom of the body of water. Vehicle 605 may use the DAT to maintain an accurate position of vehicle 605 (and base node 610, as base node 610 is coupled to vehicle 605) during descent. The vehicle 605 may communicate with the DAT to determine positional information periodically during the descent, using the position information to aid the inertial navigation system (INS) in maintaining its accuracy. Once vehicle 605 and base node 610 reach the floor of the body of water, vehicle 605 determines a final resting position of base node 610, as vehicle 605 has maintained an accurate position during descent. Vehicle 605 stores the position of base node 610 in a memory. Vehicle 605 then communicates (e.g., periodically, upon occurrence of a condition such as a particular amount of movement sensed by an inertial navigation system (INS) of vehicle 605, etc.) with base node 610, which is equipped with an acoustic modem or DAT, to update the position of vehicle 605 during the course of a mission or survey.

Figure 6:
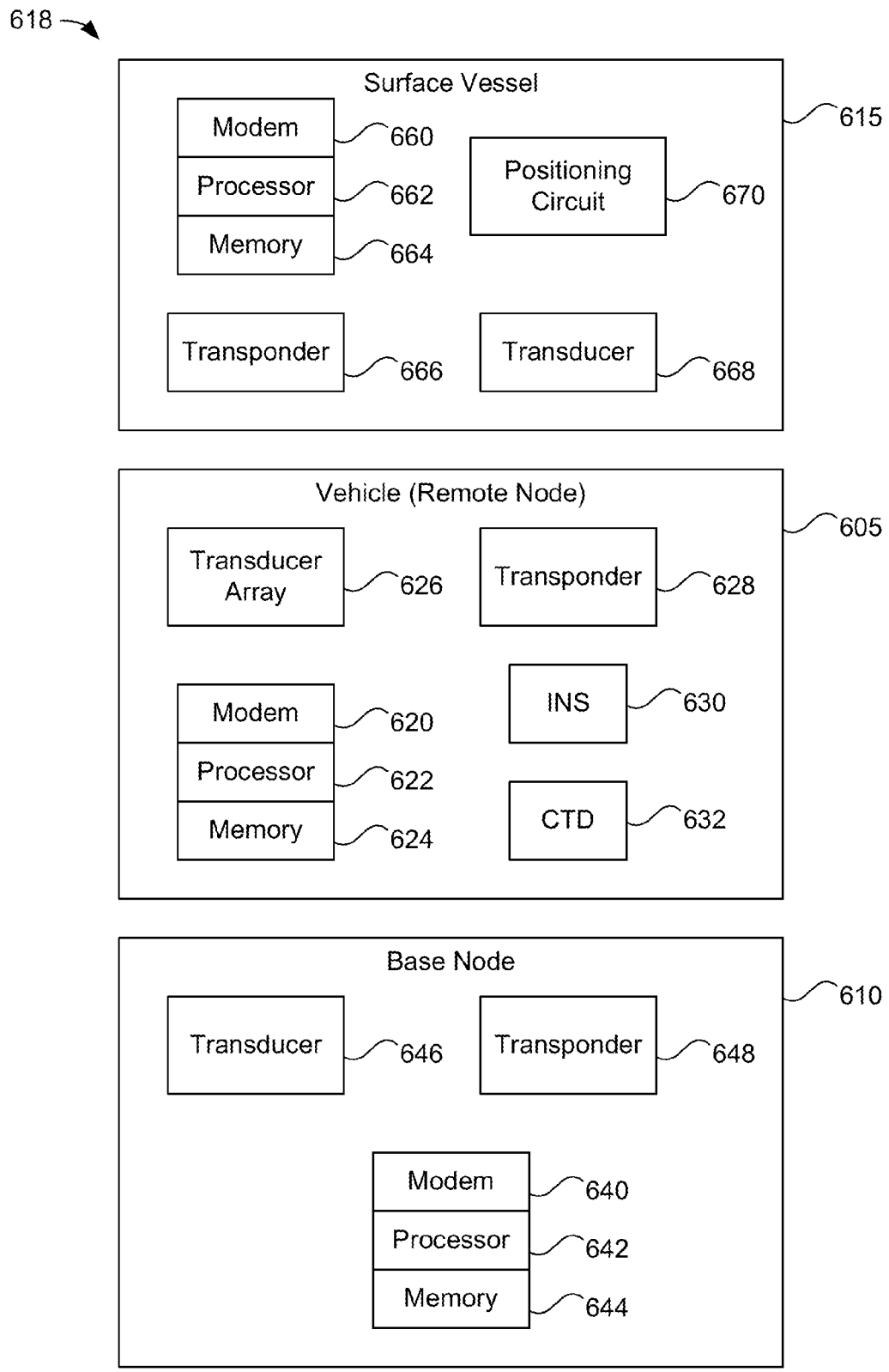
FIG. 6 is a block diagram of the system for determining a position of a base node for use in an underwater navigation system shown in FIG. 5 according to an exemplary embodiment.

Referring now to FIG. 6, a block diagram of a system 618 (e.g., a control system) for determining a position of a base node for use in an underwater navigation system (e.g., as shown in FIG. 5) according to an exemplary embodiment. Submersible vehicle 605 includes a DAT including a modem 620 and a transducer array 626. The modem 620 and/or other components of vehicle 605 include a processor 622 and a memory 624. Modem 620 and transducer array 626 are configured to determine a bearing and range associated with a received signal (e.g., as described above with respect to FIGS. 1A through 4). Modem 620 may also be configured to determine geoposition, signal transmission and/or receipt time, and/or other types of information associated with signals received from and/or exchanged with other systems. Vehicle 605 also includes a transponder 628 configured to receive a signal from modem 620 and transmit an acoustic signal to other systems (e.g., surface vessel 615 and/or base node 610).

Vehicle 605 also includes an inertial navigation system (INS) 630. INS 630 is configured to calculate (e.g., via dead reckoning) a position of vehicle 605 using sensors that track the movement of vehicle 605. INS 630 may include a motion sensor such as an accelerometer, a rotation sensor such as a gyroscope, and/or other types of sensors configured to sense movement of vehicle 605. INS 630 obtains an initial calibrated position from another positioning source, such as a GPS fix. INS 630 then detects changes in movement such as changes in geographic orientation (e.g., a move from north to east), velocity and/or acceleration (e.g., speed and direction of movement, rate of change of speed, etc.), angular orientation (e.g., rotation about an axis), and/or other movement information and uses the movement information to estimate a current location of vehicle 605 based on the previously identified position. The INS may include aiding algorithms that allow it to receive position fixes from sources other than a GPS, such as an acoustic navigational device.

Vehicle 605 may also include a conductivity, temperature, and depth (CTD) sensor 632 configured to measure conditions of the water through which signals transmitted from and/or received at vehicle 605 travel. The speed of sound varies with temperature, salinity, and pressure. Variations in sound speed in layers of the water column (e.g., a portion of the body of water through which vehicle 605 communicates with other systems, such as surface vessel 615 and/or base node 610) cause the acoustic signals to be refracted or bent as they travel through the water. For example, a signal transmitted from surface vessel 615 to submersible vehicle 605 when vehicle 605 is near the bottom of deep water may experience substantial refraction as it travels from the surface down to vehicle 605.

CTD sensor 632 includes one or more sensors configured to create a cast, or gather data, used to model conditions of the water in the water column that affect the transmission of acoustic signals through the water column. The collected data can be used by a ray tracing algorithm to account or correct for the bending of the acoustic signals received at transducer array 626. The ray tracing algorithm can be used to adjust the ranges calculated using the DAT (e.g., transducer array 626 and modem 620) to account for bending of the received signal through the water column, providing for a more accurate range calculation.

Base node 610 includes a modem 640, transducer 646 and transponder 648 configured to facilitate communications with other components of system 618 (e.g., vehicle 605 and/or surface vessel 615). For example, base node 610 may be configured to receive an acoustic signal or message from vehicle 605 using transducer 646, interpret or decode the signal using modem 640, generate a response signal using modem 640, and transmit the response signal to vehicle 605 using transponder 648. In some embodiments, base node 610 may be equipped with a DAT (e.g., a modem and a transducer array configured to detect a bearing of a received signal) instead of or in addition to vehicle 605.

Surface vessel 615 also includes a modem 660, transducer 668 and transponder 666 configured to facilitate communications with other components of system 618 (e.g., vehicle 605 and/or base node 610). In some embodiments, surface vessel 615 may also be equipped with a DAT. Surface vessel 615 is also equipped with a positioning circuit 670 configured to determine a position of surface vessel 615. Positioning circuit 670 may include a GPS system and/or a motion reference unit or other type of system configured to provide an accurate geographic state of surface vessel 615 and its associated transducer. The position provided by surface vessel 615 may in turn be used to determine a position of submersible vehicle 605 and/or base node 610. For example, vehicle 605 (e.g., while descending to the bottom) may transmit a position request signal to surface vessel 615. In some embodiments (e.g., if vehicle 605 is equipped with a DAT and surface vessel 615 is not equipped with a DAT), surface vessel 615 may determine its current position using positioning circuit 670 and send a response signal to vehicle 605 containing the current geographic state of surface vessel 615 and associated transducer. In other embodiments (e.g., if surface vessel 615 is equipped with a DAT), surface vessel 615 may reply with different or additional information, such as the bearing and/or range between surface vessel 615 and vehicle 605 or the geoposition of vehicle 605. In some embodiments, vehicle 605 may be equipped with its own positioning circuit (e.g., GPS) such that it is capable of determining its own position while surfaced.

Figure 7A:
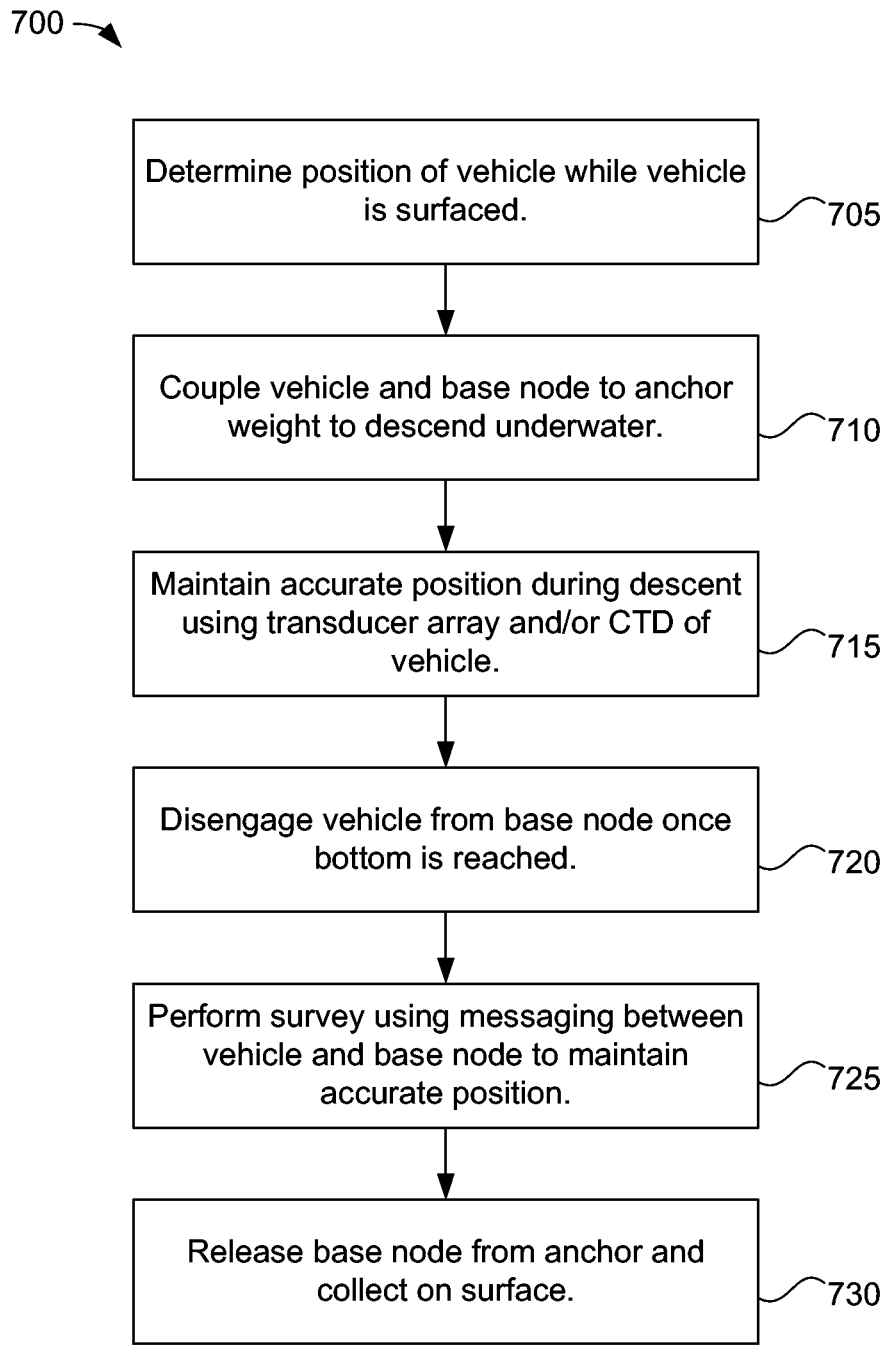
FIG. 7A is a flow diagram of a process for determining a position of a base node for use in an underwater navigation system according to an exemplary embodiment.

Referring now to FIG. 7A, a flow diagram of a process 700 for determining a position of a base node for use in an underwater navigation system is shown according to an exemplary embodiment. Process 700 is described below as being performed using components of the systems illustrated in FIGS. 5 and 6. In various embodiments, process 700 may be performed using systems having more, less, or different components than those illustrated in FIGS. 5 and 6.

Figure 7B:
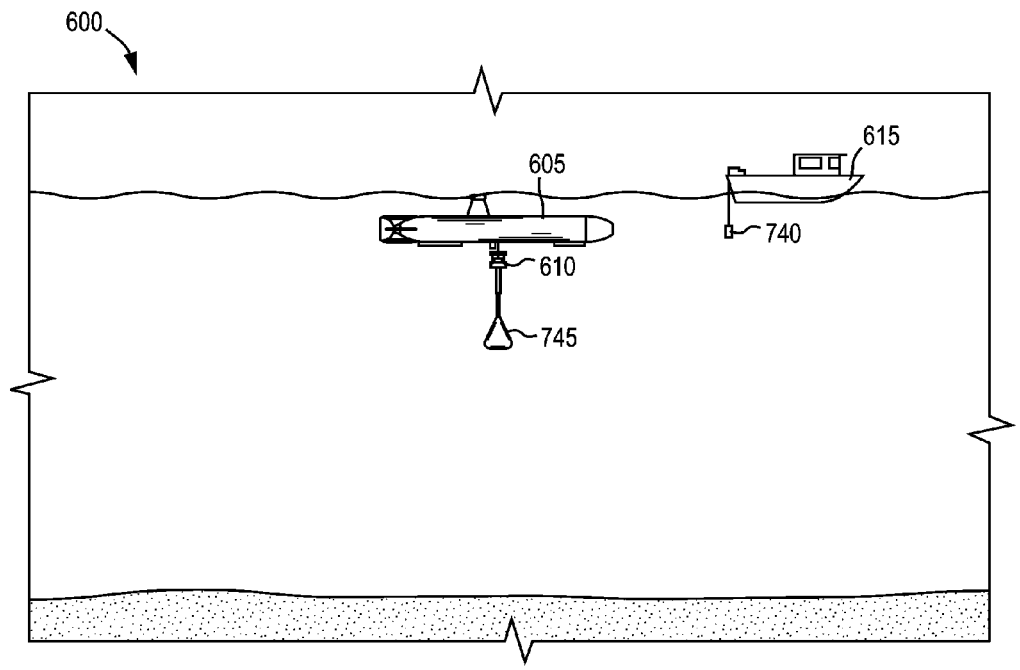
FIGS. 7B through 7E are illustrations relating to the process for determining a position of a base node shown in FIG. 7A according to exemplary embodiments.

At step 705, an accurate initial position of submersible vehicle 605 is determined. The position of vehicle 605 may be determined while the vehicle is surfaced (i.e., at or near the surface of the body of water). In some embodiments, vehicle 605 may determine its initial position with reference to surface vessel 615. For example, surface vessel 615 may utilize positioning circuit 670 (e.g., GPS) to determine an accurate position of surface vessel 615. Vehicle 615 may send a position request to surface vessel 615 using modem 620 and transponder 628. Surface vessel 615 receives the request using transducer 668 and modem 660, interprets the request using modem 660, and may respond with an acoustic message containing the current position of surface vessel 615 using modem 660 and transponder 666. The response message is received at transducer array 626 of vehicle 605, and vehicle 605 uses transducer array 626 and modem 620 to determine a range and bearing from surface vessel 615 to vehicle 605, decode the message to determine the position of surface vessel 615, and use the range, bearing, and surface vessel 615 position information to determine an accurate initial position of vehicle 605. In other embodiments (e.g., if surface vessel 615 is equipped with a DAT, or modem and transducer array), surface vessel 615 may determine range and bearing information based on the received request, and the response message sent by surface vessel 615 may contain one or more of the range, bearing, acoustic signal transmission time, and/or position of surface vessel 615 and/or vehicle 605. In some embodiments, submersible vehicle 605 may be equipped with a positioning circuit (e.g., GPS) and may be configured to determine its own initial position while surfaced. At step 710, vehicle 605 and base node 610 are coupled to an anchor weight such as a clump weight designed to cause vehicle 605 and base node 610 to sink to the bottom of the body of water. FIG. 7B illustrates system 600 with vehicle 605 in a surfaced position and vehicle 605 and base node 610 coupled to an anchor weight according to an exemplary embodiment.

Referring still to FIG. 7A, while vehicle 605 and base node 610 are descending to the bottom of the body of water, vehicle 605 is configured to maintain an accurate position of vehicle 605 (and base node 610) (step 715). Vehicle 605 may determine (e.g., periodically, upon descending to a certain estimated depth or depths, etc.) its position using INS 630. Under some circumstances, the accuracy of the position of INS 630 may be affected by errors that may accumulate as vehicle 605 descends towards the bottom of the body of water.

Figure 7C:
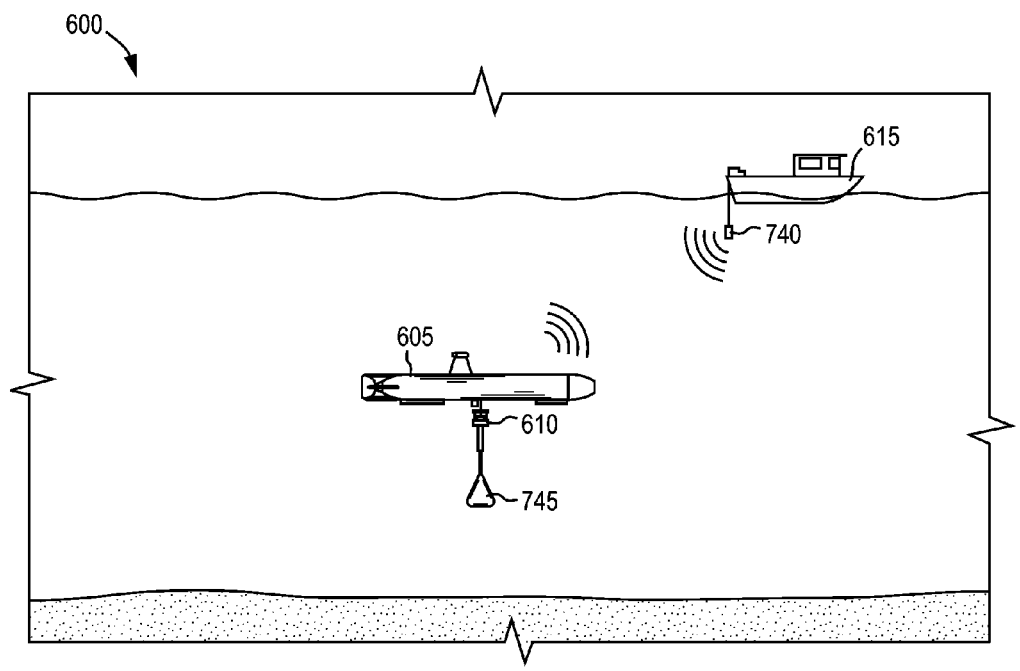

Vehicle 605 may maintain the accuracy of the determined position during descent by supplementing, adjusting, and/or checking the position estimated using INS 630 with position information obtained through acoustic communications with surface vessel 615. For example, vehicle 605 may send a position request acoustic message to surface vessel 615 using modem 620 and transponder 628. Surface vessel 615 may respond with an acoustic message containing the current position of surface vessel 615. Vehicle 605 may receive the response message at transducer array 626 and use transducer array 626 and modem 620 to determine range and bearing information and, in turn, a current position of vehicle 605. In some embodiments (e.g., if surface vessel 615 is equipped with a DAT, or modem and transducer array), surface vessel 615 may determine range and bearing information based on the received request, and the response message sent by surface vessel 615 may contain one or more of the range, bearing, acoustic signal transmission time, and/or position of surface vessel 615 and/or vehicle 605. The position determined using the acoustic messages exchanged between vehicle 605 and surface vessel 615 may be used to enhance the accuracy of the position determined by the INS. The accuracy of the position determined using the exchanged acoustic messages may be further enhanced using water property data collected using CTD 632 to account for the bending of the signals as they propagate through the water between vehicle 605 and surface vessel 615. FIG. 7C illustrates system 600 with vehicle 605 and base node 610 descending and vehicle 605 communicating with surface vessel 615 via acoustic modem messages to maintain an accurate position of vehicle 605.

In some embodiments, base node 610 may be equipped with a DAT (e.g., a transducer array) rather than or in addition to vehicle 605. In such embodiments, base node 610 may be configured to determine the accurate position of vehicle 605 and base node 610 during descent through acoustic communications between base node 610 and surface vessel 615. Base node 610 may be configured to communicate the position data to vehicle 605.

Figure 7D:
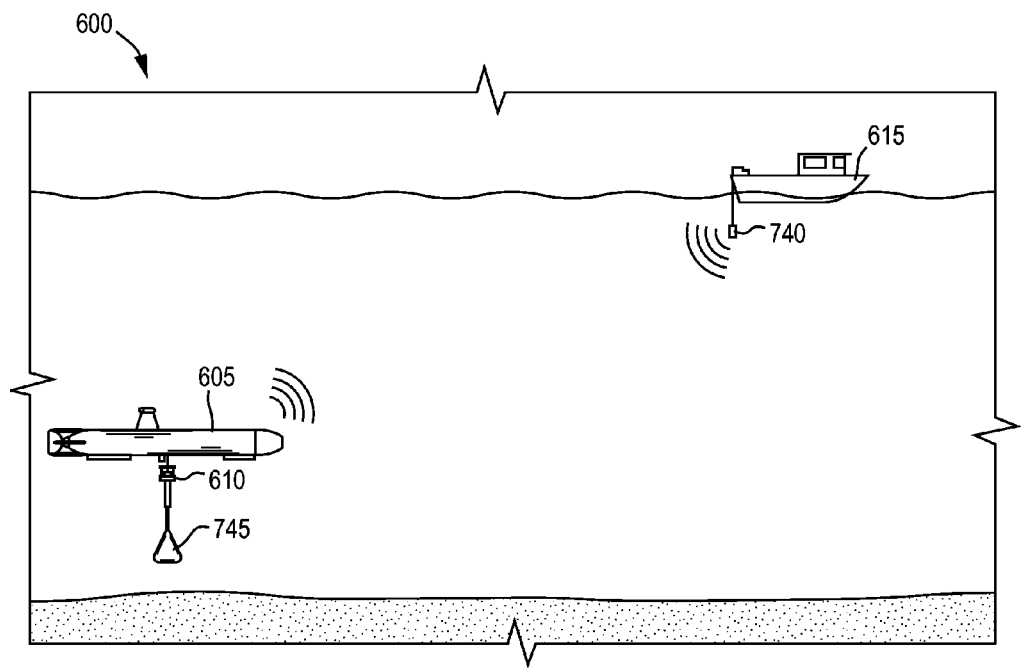

Referring again to FIG. 7A, once vehicle 605 and base node 610 reach the floor of the body of water, vehicle 605 is disengaged from base node 610 and the anchor weight (step 720). Because vehicle 605 has maintained an accurate position during descent, once vehicle 605 and base node 610 have reached the floor of the body of water, vehicle 605 can determine an accurate fixed position (e.g., latitude, longitude, and depth) of base node 610. The position of base node 610 may be stored in memory 624 of vehicle 605 and/or memory 640 of base node 610 (e.g., vehicle 605 may transmit an acoustic message to base node 610 containing the latitude, longitude, and depth of base node 610). FIG. 7D illustrates system 600 with vehicle 605 and base node 610 near a floor of the body of water and vehicle 605 still communicating with surface vessel 615 to determine an accurate position of vehicle 605.

Figure 7E:
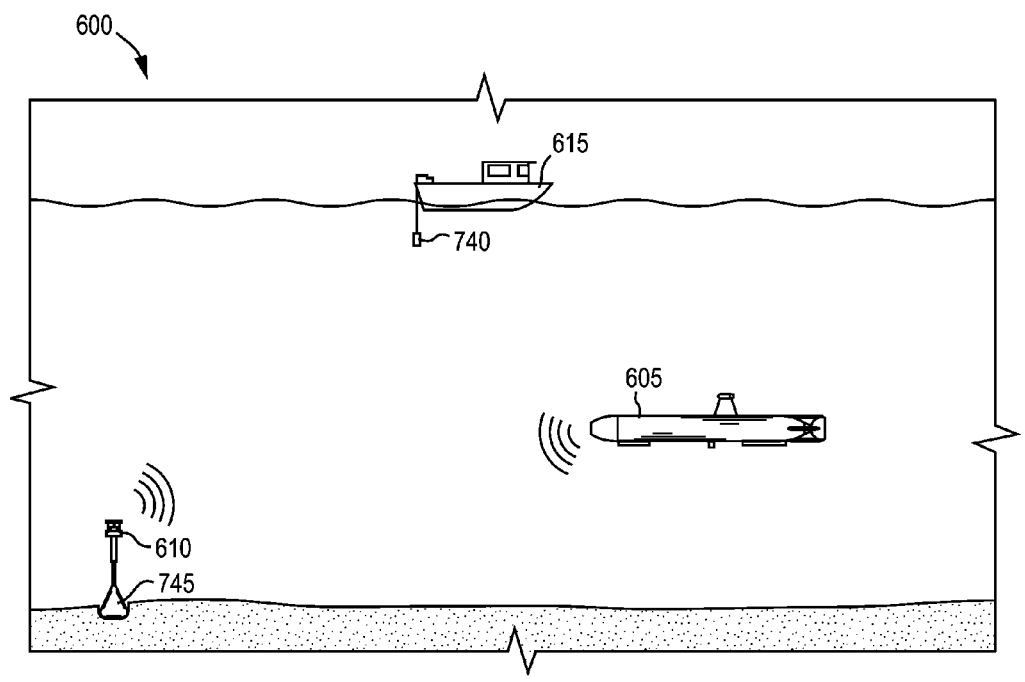

Referring still to FIG. 7A, vehicle 605 may then proceed to conduct a mission or survey (step 725). While conducting the mission or survey, vehicle 605 may estimate its position using INS 630. To maintain positional accuracy throughout the mission or survey and counteract errors that may accumulate in the positional data determined using INS 630, vehicle 605 may use acoustic modem messages transmitted between vehicle 605 and base node 610 to determine the position of vehicle 605 based on the known position of base node 610. Vehicle 605 may transmit a position request message to base node 610. In some embodiments (e.g., if base node 610 is not equipped with a DAT or transducer array), base node 610 may submit a response message that may contain the position of base node 610. Vehicle 605 may determine an updated position using transducer array 626 and modem 620 by determining a bearing and range from the response message. In other embodiments (e.g., if base node 610 is equipped with a DAT or transducer array), base node 610 may determine the bearing, range, geoposition, time, and/or other information and may transmit the information to vehicle 605 in the response message. Once the mission or survey has concluded, vehicle 605 may surface and base node 610 may be released from the anchor weight (e.g., manually, via a remotely controlled release mechanism, etc.) and collected on the surface of the body of water (step 730). FIG. 7E illustrates system 600 with vehicle 605 performing a mission or survey and communicating with base node 610 via acoustic modem messages to determine an updated position of vehicle 605.

Figure 8A:
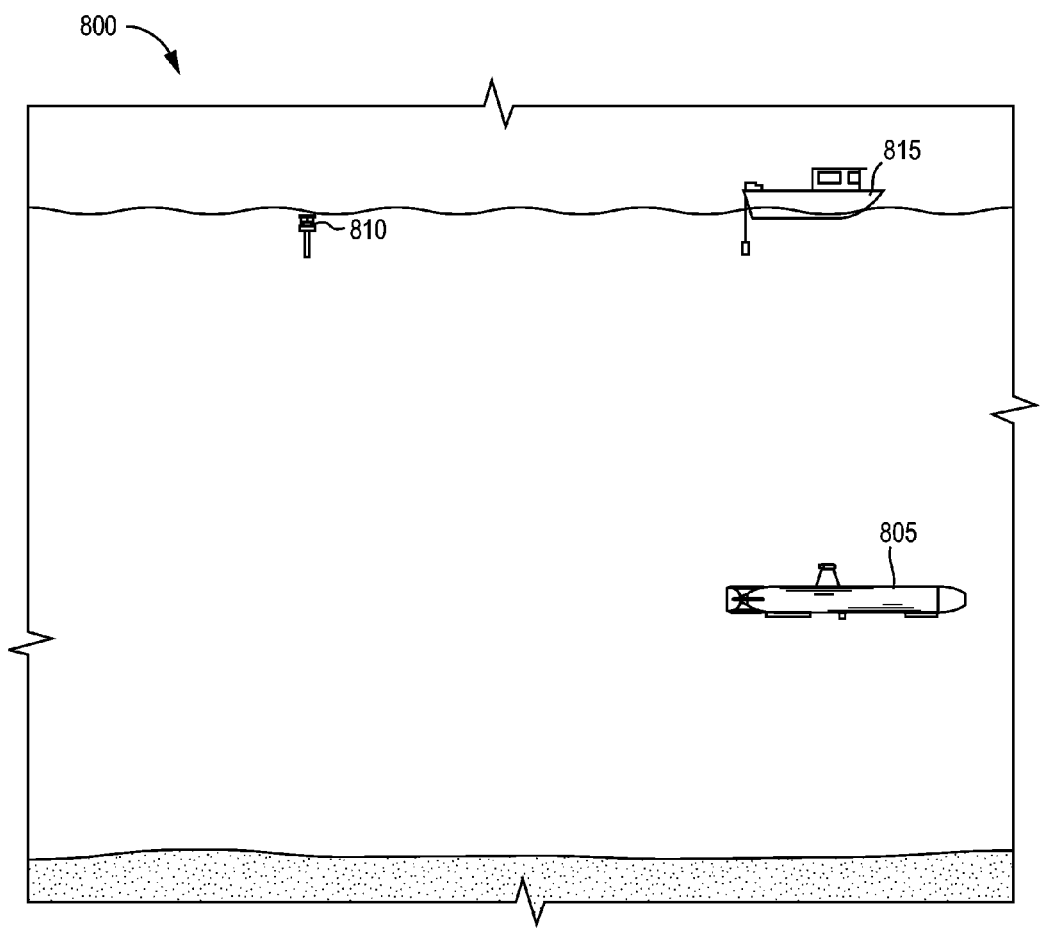
FIG. 8A is an illustration of another system for determining a position of a base node for use in an underwater navigation system according to an exemplary embodiment.

Referring now to FIG. 8A, an illustration of another system 800 for determining a position of a base node for use in an underwater navigation system is shown according to an exemplary embodiment. Like system 600, system 800 includes a submersible vehicle 805, a base node 810, and a surface vessel 815. In this exemplary embodiment, base node 810 is equipped with components that enable it to determine its own position as it descends toward the floor of the body of water (e.g., rather than relying on vehicle 805 to determine the position of base node 810). Base node 810 can be released on the surface of the water (e.g., by surface vessel 815) and weighted down to the bottom of the body of water. While descending, base node 810 may determine an accurate position through acoustic modem communication with surface vessel 815 (e.g., using a DAT, or transducer array and acoustic modem, on at least one of base node 810 and surface vessel 815), and base node 810 determines its resting position once it reaches the bottom of the body of water. Vehicle 805 can then use base node 810 and its known position to perform position updates during a mission or survey in a manner similar to that described above with respect to FIGS. 5 through 7E.

Figure 8B:
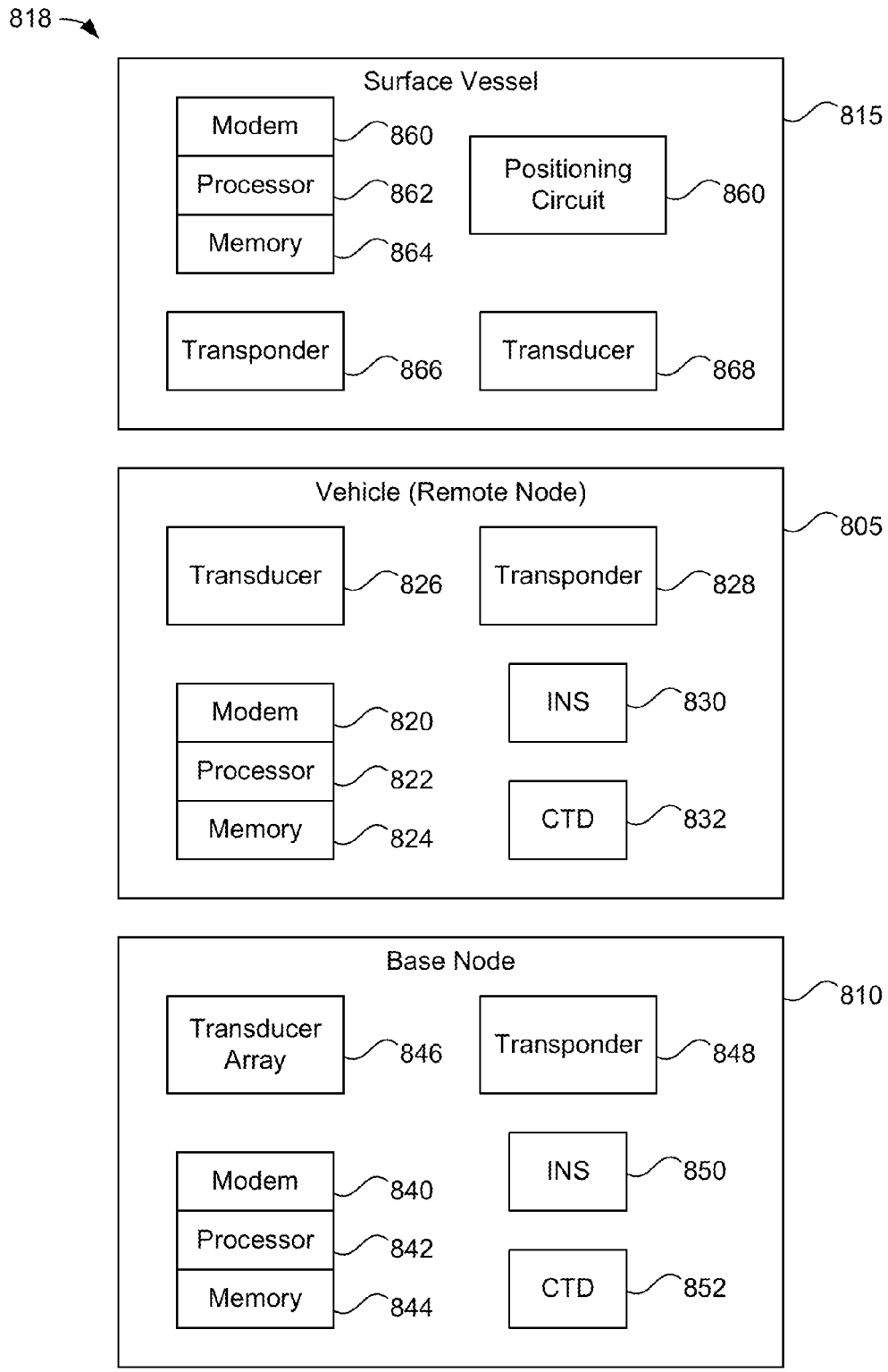
FIG. 8B is a block diagram of the system for determining a position of a base node for use in an underwater navigation system shown in FIG. 8A according to an exemplary embodiment.

Referring now to FIG. 8B, a block diagram of a system 818 for determining a position of a base node for use in an underwater navigation system (e.g., system 800 shown in FIG. 8A) is shown according to an exemplary embodiment. Several components illustrated in FIG. 8B are similar to those shown in FIG. 6. However, base node 810 is equipped with a DAT (e.g., transducer array 846 and modem 840), an INS 850, and a CTD 852. In some embodiments, base node 810 may be equipped with fewer, more, or different components. Base node 810 utilizes these components to determine its position as it descends from the surface to the floor of the body of water in a manner similar to that in which vehicle 605 determines its position during descent in the exemplary embodiments described with respect to FIGS. 5 through 7E (e.g., through acoustic modem messaging with surface vessel 815). In some embodiments, vehicle 805 and/or surface vessel 815 may also be equipped with a DAT, or transducer array.

Figure 9A:
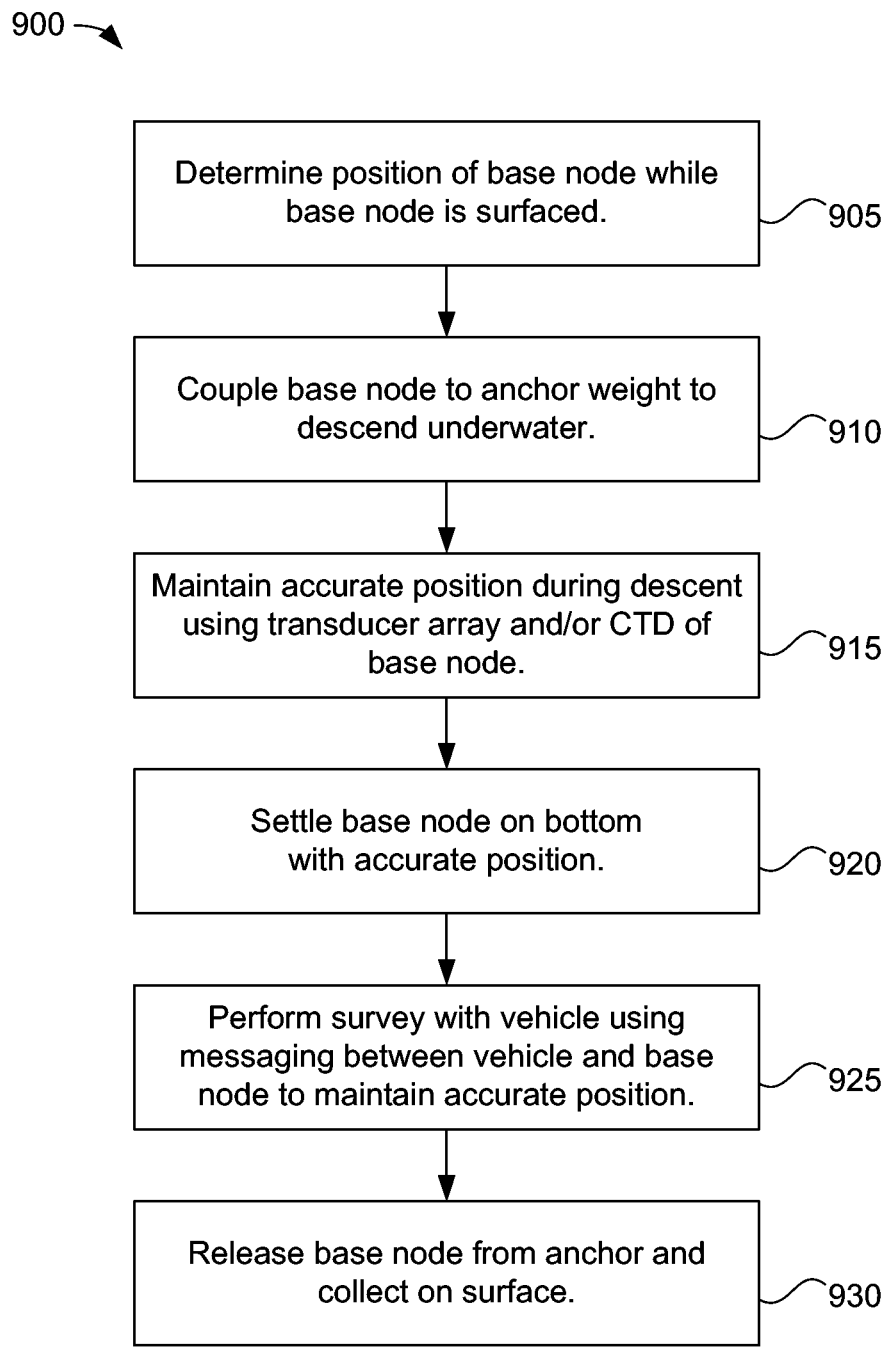
FIG. 9A is a flow diagram of another process for determining a position of a base node for use in an underwater navigation system according to an exemplary embodiment.

Referring now to FIG. 9A, a flow diagram of process 900 for determining a position of a base node for use in an underwater navigation system (e.g., using systems 800 and/or 818) is shown according to an exemplary embodiment. Process 900 is described below as being performed using components of the systems illustrated in FIGS. 8A and 8B. In various embodiments, process 900 may be performed using systems having more, less, or different components than those illustrated in FIGS. 8A and 8B.

Figure 9B:
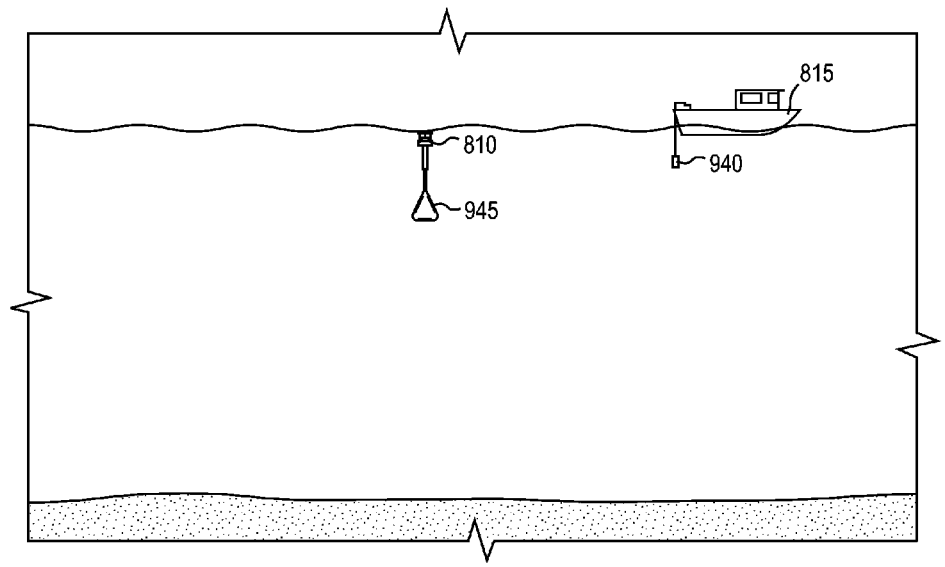
FIGS. 9B through 9E are illustrations relating to the process for determining a position of a base node shown in FIG. 9A according to exemplary embodiments.

At step 905, an accurate initial position of base node 810 is determined. The position of base node 810 may be determined while base node 810 is surfaced (i.e., at or near the surface of the body of water). In some embodiments, base node 810 may determine its initial position with reference to surface vessel 815. For example, surface vessel 815 may utilize positioning circuit 870 (e.g., GPS) to determine an accurate position of surface vessel 815. Base node 810 may send a position request to surface vessel 815 using modem 840 and transponder 848. Surface vessel 815 receives the request using transducer 868 and modem 860, interprets the request using modem 860, and may respond with an acoustic message containing the current position of surface vessel 815 using modem 860 and transponder 866. The response message is received at transducer array 846 of base node 810, and base node 810 uses transducer array 846 and modem 840 to determine a range and bearing from surface vessel 815 to base node 810, decode the message to determine the position of surface vessel 815, and use the range, bearing, and surface vessel 815 position information to determine an accurate initial position of base node 810. In other embodiments (e.g., if surface vessel 815 is equipped with a DAT, or modem and transducer array), surface vessel 815 may determine range and bearing information based on the received request, and the response message sent by surface vessel 815 may contain one or more of the range, bearing, acoustic signal transmission time, and/or position of surface vessel 815 and/or base node 810. In some embodiments, base node 810 may be equipped with a positioning circuit (e.g., GPS) and may be configured to determine its own initial position while surfaced. At step 910, base node 810 is coupled to an anchor weight such as a clump weight designed to cause base node 810 to sink to the bottom of the body of water. FIG. 9B illustrates system 800 with base node 810 in a surfaced position and base node 810 coupled to an anchor weight according to an exemplary embodiment.

Referring still to FIG. 9A, while base node 810 is descending to the bottom of the body of water, base node 810 is configured to maintain an accurate position of base node 810 (step 915). Base node 810 may determine (e.g., periodically, upon descending to a certain estimated depth or depths, etc.) its position using INS 850. Under some circumstances, the accuracy of the position of INS 850 may be affected by errors that may accumulate as base node 810 descends towards the bottom of the body of water.

Figure 9C:
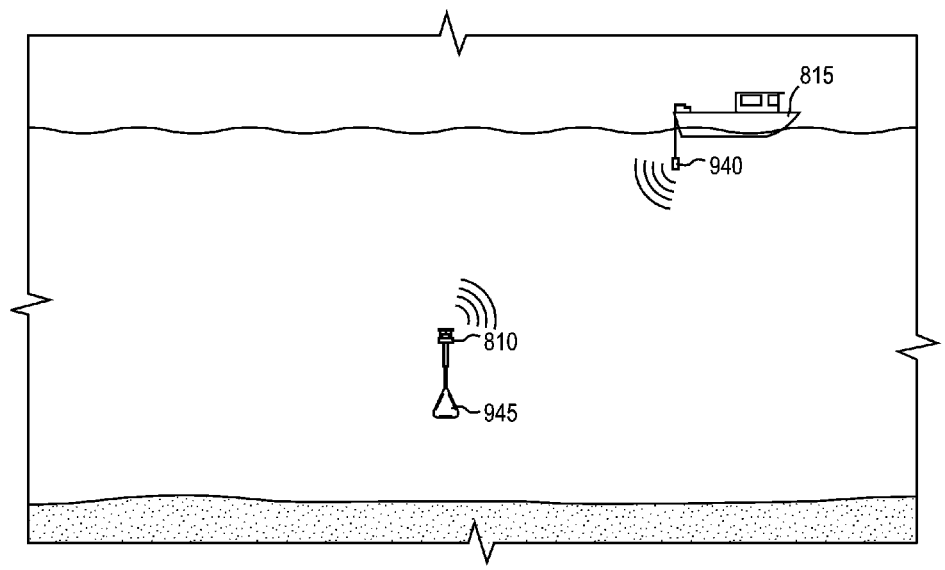

Base node 810 may maintain the accuracy of the determined position during descent by supplementing, adjusting, and/or checking the position estimated using INS 850 with position information obtained through acoustic communications with surface vessel 815. For example, base node 810 may send a position request acoustic message to surface vessel 815 using modem 840 and transponder 848. Surface vessel 815 may respond with an acoustic message containing the current position of surface vessel 815. Base node 810 may receive the response message at transducer array 846 and use transducer array 846 and modem 840 to determine range and bearing information and, in turn, a current position of base node 810. In some embodiments (e.g., if surface vessel 815 is equipped with a DAT, or modem and transducer array), surface vessel 815 may determine range and bearing information based on the received request, and the response message sent by surface vessel 815 may contain one or more of the range, bearing, acoustic signal transmission time, and/or position of surface vessel 815 and/or base node 810. The position determined using the acoustic messages exchanged between base node 810 and surface vessel 815 may be used to enhance the accuracy of the position determined by INS 850. The accuracy of the position determined using the exchanged acoustic messages may be further enhanced using water property data collected using CTD 852 to account for the bending of the signals and sound speed as they propagate through the water between base node 810 and surface vessel 815. FIG. 9C illustrates system 800 with base node 810 descending and communicating with surface vessel 815 via acoustic modem messages to maintain an accurate position of base node 810.

Figure 9D:
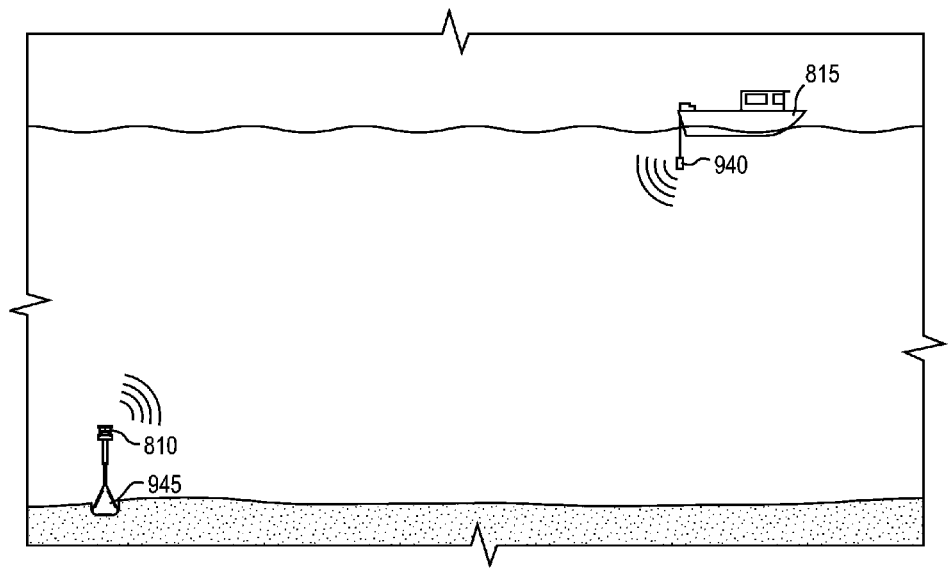

Referring again to FIG. 9A, once base node 810 reaches the floor of the body of water, base node 810 can determine its accurate fixed position (e.g., latitude, longitude, and depth) (step 920). The position of base node 810 may be stored in memory 840 of base node 810. FIG. 9D illustrates system 800 with base node 810 near a floor of the body of water and still communicating with surface vessel 815 to determine an accurate position of base node 810.

Figure 9E:
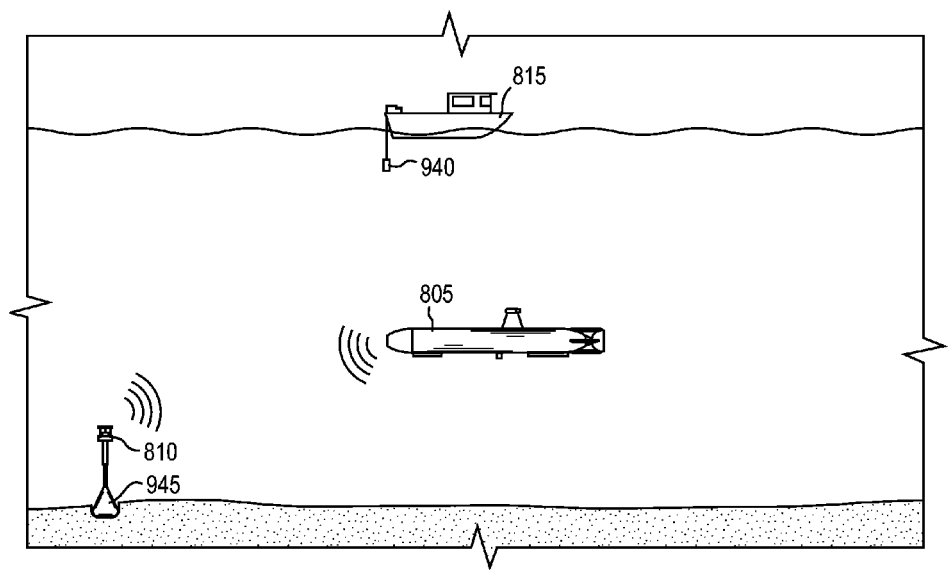

Referring still to FIG. 9A, vehicle 805 may then proceed to conduct a mission or survey (step 925). While conducting the mission or survey, vehicle 805 may estimate its position using INS 830. To maintain positional accuracy throughout the mission or survey and counteract errors that may accumulate in the positional data determined using INS 830, vehicle 805 may use acoustic modem messages transmitted between vehicle 805 and base node 810 to determine the position of vehicle 805 based on the known position of base node 810. Vehicle 805 may transmit a position request message to base node 810. Base node 810 may generate and transmit a response message that contains bearing, range, geoposition, time, and/or other information to vehicle 805. Once the mission or survey has concluded, vehicle 805 may surface and base node 810 may be released from the anchor weight (e.g., manually, via a remotely controlled release mechanism, etc.) and collected on the surface of the body of water (step 930). FIG. 9E illustrates system 800 with vehicle 805 performing a mission or survey and communicating with base node 810 via acoustic modem messages to determine an updated position of vehicle 805.

Various exemplary embodiments described herein may be applied in a variety of systems or applications. For example, in some embodiments, a base node and submersible vehicle (e.g., human operated, autonomous, remotely operated, etc.) may be used to perform deep water surveys relating to oil and/or gasoline extraction. In other embodiments, a base node may be used in conjunction with a device coupled to a diver (e.g., a hand-held or wearable device) to determine an accurate position of a diver during a diving operation. In some embodiments, a base node may be used to determine the location of divers and/or vehicles in conjunction with a military or defense-related mission. In some embodiments, a base node may be used to determine the location of one or more oceanographic instrumentation packages in conjunction with an oceanographic survey or mission.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of determining a position of a submersible vehicle within a body of water, comprising:
    determining an initial position of a base node while the base node is at or near a surface of the body of water;
    coupling the base node to a weight configured to descend the base node to a floor of the body of water;
    updating, by the base node, a position of the base node during descent by exchanging acoustic signals between the first acoustic modem of the base node and the second acoustic modem of the surface vessel, comprising:
        determining a range between the base node and the surface vessel using an acoustic signal from the surface vessel;
        measuring data regarding at least one property of the body of water that affects the transmission of acoustic signals between the base node and the surface vessel using a sensor of the base node; and
        updating, by the base node, the determined range based on the measured data regarding at least one property of the body of water that affects the transmission of the acoustic signals;
    determining a position of the base node once the base node has reached the floor of the body of water, wherein determining a position of the base node comprises exchanging acoustic signals between a first acoustic modem of the base node and a second acoustic modem of a surface vessel; and
    determining a position of the vehicle based on the position of the base node and acoustic signals exchanged between the first acoustic modem of the base node and a third acoustic modem of the vehicle.

2. The method of claim 1, wherein measuring data regarding at least one property of the body of water, comprises:
    measuring temperature data, salinity data, or pressure data of the water, or combinations thereof.

3. The method of claim 1, wherein determining the initial position of the base node comprises determining the initial position of the base node using a positioning circuit of the base node.

4. The method of claim 3, wherein determining the initial position of the base node using a positioning circuit of the base node comprises determining the initial position of the base node using a global positioning system.

5. The method of claim 1, wherein determining a position of the vehicle comprises:
    determining the position of the vehicle using an inertial navigation system; and
    updating the position of the vehicle based on the position of the base node and the acoustic signals exchanged between the first acoustic modem of the base node and the third acoustic modem of the vehicle.

6. The method of claim 1, wherein at least one of determining a position of the base node and determining a position of the vehicle comprises:
    receiving an acoustic signal at a plurality of transducers of the base node;
    determining a bearing and a range associated with the acoustic signal based on a difference in the phase and timing of the signal as it is received at each of the plurality of transducers; and
    determining the respective position based on the bearing and the range.

7. The method of claim 1, wherein measuring data regarding one or more properties of the body of water using a sensor of the base node, comprises:
    measuring data using a conductivity sensor, a temperature sensor, or a depth sensor, or combinations thereof.

8. The method of claim 5, wherein determining the position of the vehicle using an inertial navigation system comprises determining the position of the vehicle using at least one of a velocity sensor, an acceleration sensor, or a rotation sensor, or combinations thereof.

9. A method of determining a position of a submersible vehicle within a body of water, comprising:
    determining an initial position of a base node while the base node is at or near a surface of the body of water;
    coupling the base node to a weight configured to descend the base node to a floor of the body of water;
    updating, by the base node, a position of the base node during descent by exchanging acoustic signals between the first acoustic modem of the base node and the second acoustic modem of the surface vessel, comprising:
        determining a range between the base node and the surface vessel using an acoustic signal from the surface vessel;
        measuring data regarding at least one property of the body of water that affects the transmission of acoustic signals between the base node and the surface vessel using a sensor of the base node; and
        updating, by the base node, the determined range based on the measured data regarding at least one property of the body of water that affects the transmission of the acoustic signals;
    determining a position of the base node once the base node has reached the floor of the body of water, wherein determining a position of the base node comprises exchanging acoustic signals between a first acoustic modem of the base node and a second acoustic modem of a surface vessel;
    exchanging signals between the first acoustic modem of the base node and a third acoustic modem of the vehicle;
    determining, by the base node, a position of the vehicle based on the position of the base node and the acoustic signals exchanged between the base node and the vehicle; and
    receiving, by the vehicle, the position of the vehicle from the base node.

10. The method of claim 9, wherein receiving the position of the vehicle from the base node comprises receiving, by the vehicle, at least one of a bearing, a range, a geoposition, or a time from the base node, or combinations thereof.

11. The method of claim 9, wherein exchanging signals between the base node and the vehicle comprises:
    sending a request signal from the vehicle to the base node; and
    receiving a response signal from the base node by the vehicle.

12. The method of claim 11, further comprising:
    receiving the request signal by a base node multi-transceiver array; and
    determining a bearing of the vehicle from the received request signal.

13. The method of claim 12, wherein the multi-transceiver array comprises a plurality of hydrophones.

14. A method of determining a position of a submersible vehicle within a body of water, comprising:
- determining an initial position of a base node while the base node is at or near a surface of the body of water;
- coupling the base node to a weight configured to descend the base node to a floor of the body of water;
- updating, by the base node, a position of the base node during descent by exchanging acoustic signals between the first acoustic modem of the base node and the second acoustic modem of the surface vessel, comprising:
  - determining a range between the base node and the surface vessel using an acoustic signal from the surface vessel;
  - measuring data regarding at least one property of the body of water that affects the transmission of acoustic signals between the base node and the surface vessel using a sensor of the base node; and
  - updating, by the base node, the determined range based on the measured data regarding at least one property of the body of water that affects the transmission of the acoustic signals;
- determining a position of the base node once the base node has reached the floor of the body of water, wherein determining a position of the base node comprises exchanging acoustic signals between a first acoustic modem of the base node and a second acoustic modem of a surface vessel;
- exchanging signals between the first acoustic modem of the base node and a third acoustic modem of the vehicle; and
- determining, by the vehicle, a position of the vehicle based on the position of the base node and the acoustic signals exchanged between the base node and the vehicle.

15. The method of claim 14, wherein determining a position of the vehicle further comprises updating a position of the vehicle derived from an inertial navigation system.

16. The method of claim 15, wherein updating a position of the vehicle derived from an inertial navigation system comprises updating a position of the vehicle derived from at least one of a velocity sensor, an acceleration sensor, or a rotation sensor, or combinations thereof.

17. The method of claim 14, wherein determining a position of the vehicle based on the acoustic signals exchanged between the base node and the vehicle comprises:
- determining a range of the vehicle based on a time lapse between a transmission of a first acoustic signal from the vehicle and a receipt of a second acoustic signal from the base node by the vehicle; and
- receiving a vehicle bearing from the base node.

18. The method of claim 17, wherein determining a range further comprises compensating the time lapse for a Doppler effect.

* * * * *